US008855650B2

(12) United States Patent  
Ishii (10) Patent No.: US 8,855,650 B2  
(45) Date of Patent: Oct. 7, 2014

(54) COMMUNICATION SYSTEM

(75) Inventor: Takahito Ishii, Hachiogi (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1003 days.

(21) Appl. No.: 12/942,244

(22) Filed: Nov. 9, 2010

(65) Prior Publication Data

US 2011/0124336 A1 May 26, 2011

(30) Foreign Application Priority Data

Nov. 17, 2009 (JP) ................................ 2009-262210

(51) Int. Cl.
*H04W 36/00* (2009.01)
*G01S 5/02* (2010.01)
*G01S 5/00* (2006.01)
*H04W 48/20* (2009.01)

(52) U.S. Cl.
CPC ............. *H04W 48/20* (2013.01); *G01S 5/0252* (2013.01); *G01S 5/0018* (2013.01); *G01S 2205/007* (2013.10)
USPC ............. 455/440; 370/331; 370/332; 455/69; 455/115.3; 455/452.2; 455/456.1

(58) Field of Classification Search
USPC ......... 370/331, 332, 333, 334, 335, 336, 337, 370/338; 455/422.1, 432.1, 432.3, 433, 455/434, 435.1, 435.2, 435.3, 436, 437, 455/438, 439, 440, 442, 443, 450, 561, 455/115.1, 115.3, 423, 448, 456.1, 69, 455/452.2
See application file for complete search history.

(56) References Cited

U.S. PATENT DOCUMENTS

| 7,917,147 B2* | 3/2011 | Bond ............................ 455/446 |
| 8,098,590 B2* | 1/2012 | Catovic et al. ................ 370/252 |
| 8,463,271 B2* | 6/2013 | Kim ............................ 455/436 |
| 2004/0097237 A1* | 5/2004 | Aoyama ....................... 455/445 |
| 2007/0037570 A1* | 2/2007 | Donovan et al. ............. 455/423 |
| 2009/0209254 A1* | 8/2009 | Oguchi ......................... 455/434 |

FOREIGN PATENT DOCUMENTS

| JP | 2002-232344 | 8/2002 |
| JP | 2007-243878 | 9/2007 |
| JP | 2007-318594 | 12/2007 |
| JP | 2008-288777 | 11/2008 |

* cited by examiner

*Primary Examiner* — Mahendra Patel
*Assistant Examiner* — Edd Rianne Plata
(74) *Attorney, Agent, or Firm* — Wenderoth, Lind & Ponack, L.L.P.

(57) ABSTRACT

A communication system in which a network side and a mobile station apparatus communicate with each other through a base station apparatus. In the mobile station apparatus, a position information acquisition device acquires the position information regarding the mobile station apparatus. At the network side, a network side quality information receiving device receives the data in which the position information transmitted from the mobile station apparatus and quality information regarding each cell are associated with each other. A network side quality information storage device stores the data received by the network side quality information receiving device or a result after processing the data. A network side quality information transmitting device transmits the quality information regarding each cell, which corresponds to the position information regarding the mobile station apparatus, to the mobile station apparatus on the basis of the content stored in the network side quality information storage device.

15 Claims, 7 Drawing Sheets

Fig.1

| Position information | Station (cell) in range | Quality information |
|---|---|---|
| (X1,Y1) | A | 2 |
| | B | 2 |
| | C | 3 |
| (X2,Y2) | A | 1 |
| | C | 2 |
| | D | 3 |
| (X3,Y3) | B | 3 |
| | E | 2 |
| | F | 2 |

COMMUNICATION SYSTEM

BACKGROUND OF THE INVENTION

1. Field of the Invention

The present invention relates to a mobile station apparatus of a mobile communication system and in particular, to a mobile station apparatus capable of simplifying cell shift processing and handover processing in a communication state.

2. Background Art

In a mobile communication system, signal transmission and reception are wirelessly performed between a base station apparatus and a mobile station apparatus.

Figure 6:
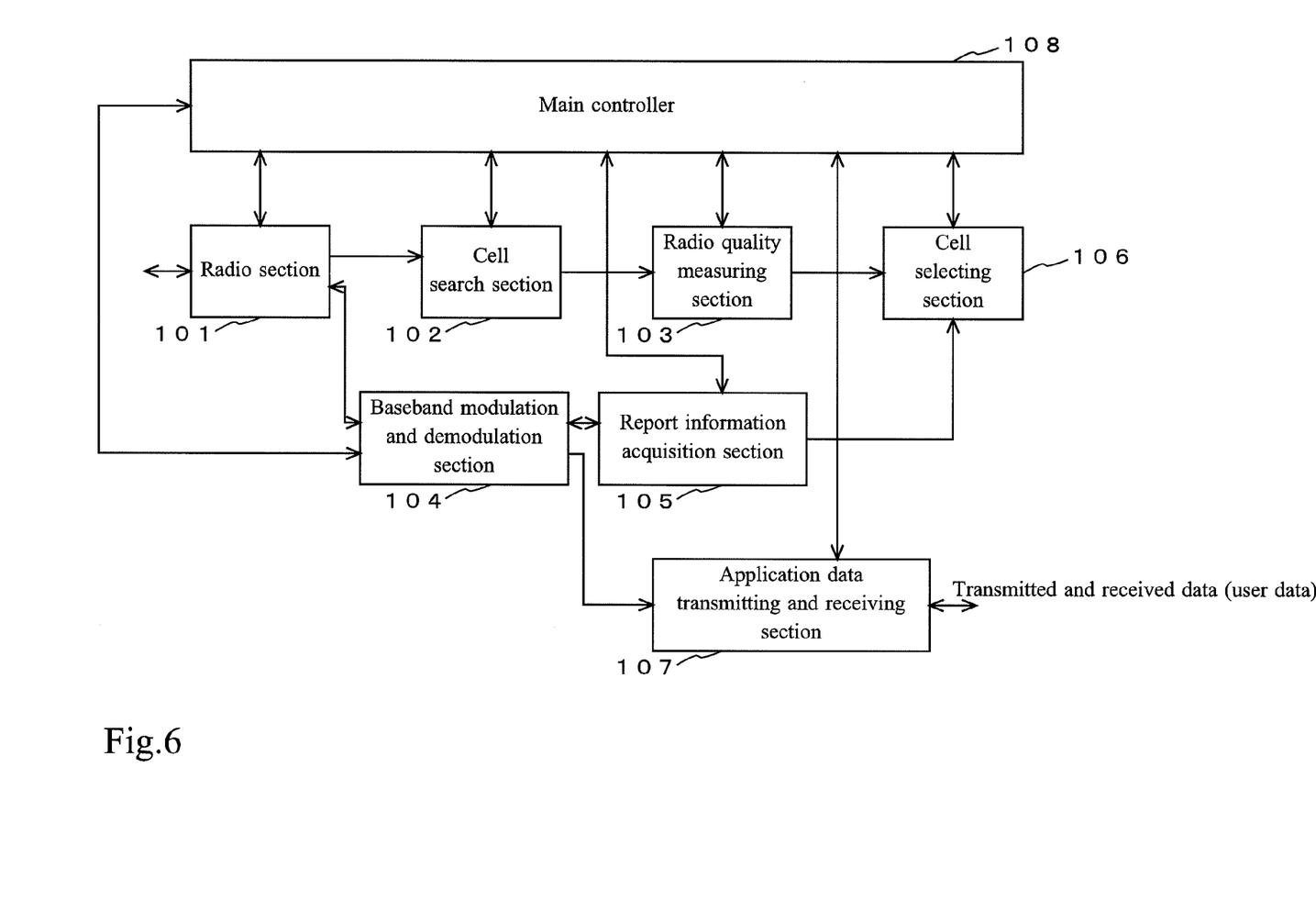
FIG. 6 is a view showing an example of the configuration of a mobile station apparatus in a mobile communication system in the related art.

FIG. 6 shows an example of the configuration of a mobile station apparatus which is a mobile radio communication terminal, for example, in a mobile communication system in the related art.

The mobile station apparatus in this example includes a radio section 101, a cell search section 102, a radio quality measuring section 103, a baseband modulation and demodulation section 104, a report information acquisition section 105, a cell selecting section 106, an application data transmitting and receiving section 107, and a main controller 108.

The radio section 101 transmits and receives communication signals between the base station apparatus and the mobile station apparatus and performs band conversion between a signal in a radio frequency band and a signal in a baseband.

The cell search section 102 performs cell search processing, such as identification of a cell and detection of a path, from the signal converted into a baseband signal.

The radio quality measuring section 103 measures the radio quality (for example, RSCP (desired power of a received wave per code channel) or Ec/Io) of a service cell or an adjacent cell.

The baseband modulation and demodulation section 104 performs baseband demodulation processing on the signal converted into a baseband signal and baseband modulation processing for transmitting the data to a network side through the radio section 101 and the base station apparatus.

The report information acquisition section 105 acquires the report information, which is transmitted from the network side through the base station apparatus, among the data subjected to the baseband demodulation processing.

The cell selecting section 106 selects a cell to be connected to, selects a cell to shift to, and selects a cell to be added by diversity handover, for example, using the report information acquired by the report information acquisition section 105 and the radio quality measured by the radio quality measuring section 103.

The application data transmitting and receiving section 107 performs transmission and reception of the data (for example, user data) according to the communication application executed by the mobile station apparatus in this example.

The main controller 108 executes call processing and the like as a mobile station apparatus while performing overall control of the respective sections of the radio section 101 to the application data transmitting and receiving section 107.

Next, an example of operation performed by a mobile station apparatus of a mobile communication system in the related art will be described.

Here, the case where a service cell does not exist or the case of an operation in a standby state (in this specification, a mode in this case is called an idle mode) and the case of an operation during communication (in this specification, a mode in this case is called a communication mode) will be separately described.

An operation in the idle mode will be described.

When a mobile station apparatus is out of a service area, a frequency in the radio section 101 is set and the cell search section 102 starts cell search processing. If there is an effective signal in the frequency set in the radio section 101, it is detected as a connection candidate cell by the cell search section 102. As a method of determining an effective signal, for example, a method may be considered in which it is determined to be effective when a quality measurement result in the radio quality measuring section 103 regarding a detection signal (candidate cell) is equal to or larger than a predetermined threshold value.

Then, the baseband modulation and demodulation section 104 receives a signal of a connection candidate cell, and the report information acquisition section 105 acquires the report information regarding the candidate cell. When it is determined to be a connectable cell from the analysis result of the report information acquired by the report information acquisition section 105, the state transitions to the "service area". On the other hand, when there is no effective detection in the cell search section 102 or when it is determined that it is a cell under construction or it is not a connectable cell because it belongs to other service providers, for example, from the analysis result of the report information acquisition section 105, a next frequency is set in the radio section 101 and the above operation is repeatedly performed until the mobile station apparatus transitions to the "service area".

When the mobile station apparatus is in the service area, the cell determined to be a "connectable cell (station)" is set as a service cell, and the radio quality of the service cell is periodically measured using the radio section 101, the cell search section 102, and the radio quality measuring section 103. Moreover, on the basis of the "adjacent station information" in the report information regarding the service cell acquired by the report information acquisition section 105, the radio quality is periodically measured similarly using the radio section 101, the cell search section 102, and the radio quality measuring section 103. If the cell selecting section 106 determines that the quality of an adjacent cell is better than the quality of the service cell during the periodic measurements, the mobile station apparatus shifts from the service cell to the adjacent cell.

An operation in the communication mode will be described.

In the communication mode, a frequency of the service cell is set in the radio section 101, the baseband modulation and demodulation section 104 performs transmission and reception of a signal of the service cell, and the application data transmitting and receiving section 107 performs communication with the network side while performing transmission and reception of the application data. Also in the communication mode, a search operation is performed in preparation for deterioration of the radio quality of the service cell. Although this search operation is the same as that in the idle mode, handover processing or shift of the service cell is executed as a result of search processing. According to the shift of the service cell, the report information regarding a new service cell is acquired and processing in the communication mode is continuously executed.

JP-A-2007-243878 discloses the related art.

Regarding a mobile station apparatus of a mobile communication system in the related art, problems of the operation in the related art will be described.

In the idle mode, especially when a mobile station apparatus is within a service cell, for example, all adjacent stations notified through the report information are searched for in a sequential manner in the related art. If an effective cell exists at the beginning of adjacent station setting, the adjacent station can be detected in a short time. However, if an effective cell exists at the final stage of the adjacent station setting, it takes too much time for the effective cell to be detected.

Similarly, also in the communication mode, all cells registered in adjacent stations of the report information regarding a service cell should be searched for. Therefore, it takes too much time to search for an adjacent station.

SUMMARY OF THE INVENTION

The invention has been made in view of the above problems in the related art, that is, problems relevant to cell shift processing and handover processing in a communication state which are operations performed by a mobile station apparatus of a mobile communication system in the related art, and it is an object of the invention to provide a mobile station apparatus of a mobile communication system capable of simplifying the cell shift processing and the handover processing in a communication state.

In order to achieve the above object, according to an aspect of the invention, there is provided a communication system in which a network side and a mobile station apparatus communicate with each other through a base station apparatus. In the mobile station apparatus, a position information acquisition means acquires the position information regarding the mobile station apparatus. A search means searches for a cell of the base station apparatus. A quality information detecting means detects the quality information of radio communication regarding the cell searched for by the search means. A quality information transmitting means transmits the data, in which the position information acquired by the position information acquisition means and the quality information regarding each cell detected by the quality information detecting means are associated with each other, to the network side. A quality information receiving means receives the quality information regarding each cell corresponding to the position information regarding the mobile station apparatus transmitted from the network side. A cell selecting means selects a cell on the basis of the quality information regarding each cell corresponding to the position information regarding the mobile station apparatus received by the quality information receiving means. At the network side, a network side quality information receiving means receives the data in which the position information transmitted from the mobile station apparatus and the quality information regarding each cell are associated with each other. A network side quality information storage means stores the data received by the network side quality information receiving means or a result after processing the data. A network side quality information transmitting means transmits the quality information regarding each cell, which corresponds to the position information regarding the mobile station apparatus, to the mobile station apparatus on the basis of the content stored in the network side quality information storage means.

As described above, according to the communication system of the invention, it is possible to simplify cell shift processing and handover processing in a communication state, for example, and this can improve the efficiency.

DETAILED DESCRIPTION OF THE INVENTION

Embodiments of the invention will be described with reference to the accompanying drawings.

First, an example of a communication system is shown.

Figure 7:
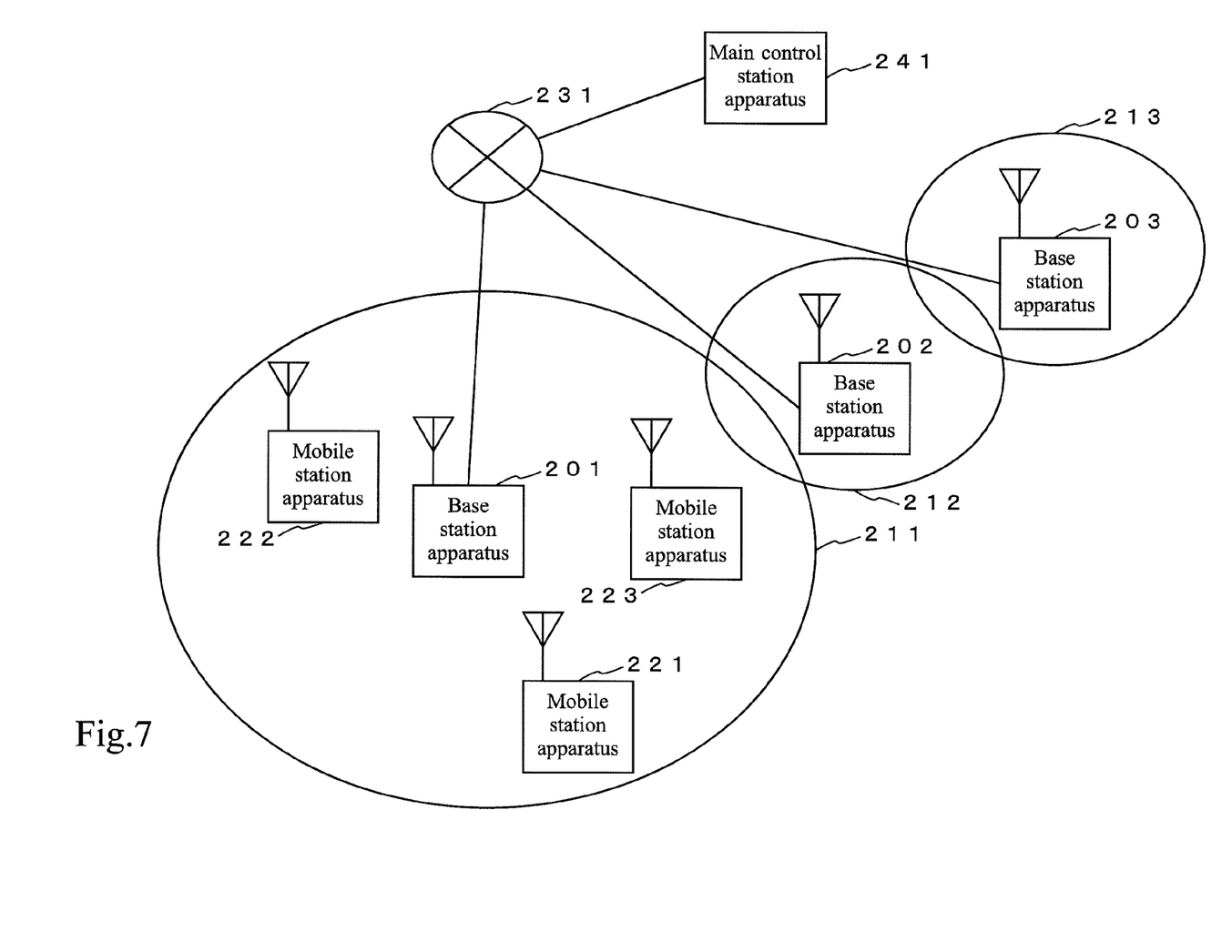
FIG. 7 is a view showing an example of the configuration of a communication system.

FIG. 7 shows an example of the configuration of a communication system (mobile communication system) used in the present embodiment.

The communication system in this example includes a plurality of base station apparatuses 201 to 203, a plurality of mobile station apparatuses 221 to 223 which are radio communication terminals, such as mobile radio communication terminals, a network 231, and a main control station apparatus 241.

In addition, communication areas (cells) 211 to 213 of the base station apparatuses 201 to 203 are shown in FIG. 7.

Here, the base station apparatuses 201 to 203 can perform radio communication with the mobile station apparatuses 221 to 223 existing in the communication areas 211 to 213 of the base station apparatuses 201 to 203. For example, the base station apparatuses 201 to 203 store the identification information and the like of the mobile station apparatuses 221 to 223, which are subordinate to the base station apparatuses 201 to 203 (belonging to the base station apparatuses 201 to 203 as communication parties), in memories and manage them. The mobile station apparatuses 221 to 223 determine parties (base station apparatuses 201 to 203), which are actually connected for communication, on the basis of the quality of radio communication with the communicable base station apparatuses 201 to 203 to perform handover and the like.

In addition, the base station apparatuses 201 to 203 are connected to a network 231, and the main control station apparatus 241 is connected to the network 231.

In this example, control or processing on the network side is performed by the main control station apparatus 241. For example, the main control station apparatus 241 communicates with the mobile station apparatuses 221 to 223 through the base station apparatuses 201 to 203, stores the required information such as a radio quality database shown in FIG. 2, and executes processing required in the flows shown in FIGS. 3 to 5.

In addition, although an example of the configuration using cells is shown in this example, it is also possible to use other configurations, such as a configuration using sector cells.

Figure 1:
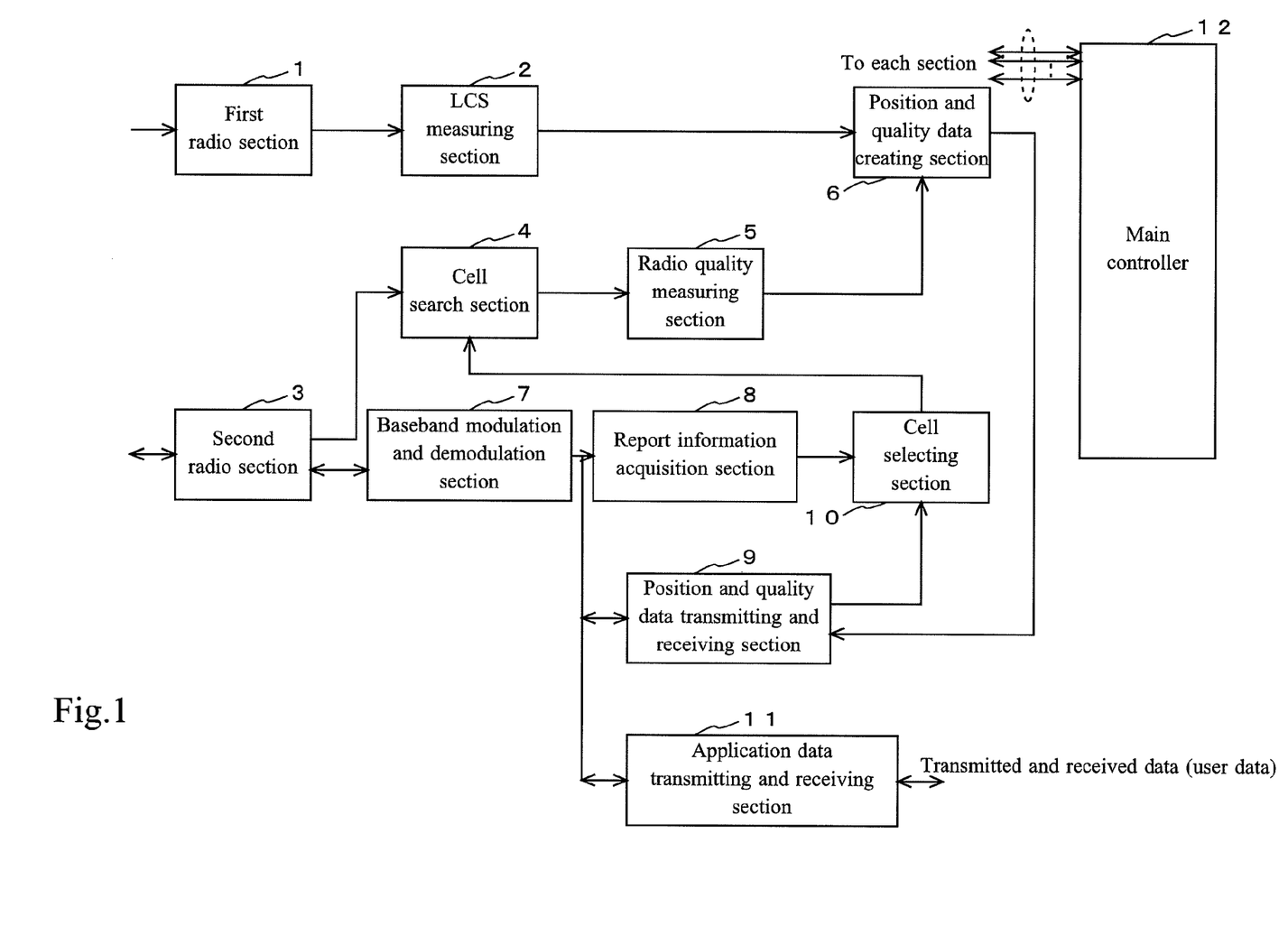
FIG. 1 is a view showing an example of the configuration of a mobile station apparatus in a mobile communication system according to an embodiment of the invention.

FIG. 1 shows an example of the configuration of a mobile station apparatus which is a mobile radio communication terminal, for example, in a mobile communication system according to an embodiment of the invention.

The mobile station apparatus in this example includes a first radio section 1, an LCS (LoCation Service; position information service) measuring section 2, a second radio section 3, a cell search section 4, a radio quality measuring section 5, a position and quality data creating section 6, a baseband modulation and demodulation section 7, a report information acquisition section 8, a position and quality data transmitting and receiving section 9, a cell selecting section 10, an application data transmitting and receiving section 11, and a main controller 12.

In addition, the LCS is a position information acquisition technique proposed by 3GPP (3rd Generation Partnership Project).

An example of an operation performed by the mobile station apparatus in this example is shown.

The first radio section 1 receives a signal in a radio frequency band of a GPS (Global Positioning System), for example, using an antenna, converts the received signal into a signal in a baseband, and outputs it to the LCS measuring section 2.

The LCS measuring section 2 acquires the position information regarding the mobile station apparatus using the received GPS signal, which is input from the first radio section 1, and outputs the information to the position and quality data creating section 6.

The second radio section 3 transmits and receives communication signals between the base station apparatus and the mobile station apparatus in the mobile communication system in this example, for example, using an antenna and performs band conversion between a signal in a radio frequency band and a signal in a baseband. Specifically, the second radio section 3 performs band conversion of a received signal in a radio frequency band into a signal in a baseband and outputs it to the cell search section 4 or the baseband modulation and demodulation section 7. Moreover, the second radio section 3 performs band conversion of the signal in the baseband, which is input from the baseband modulation and demodulation section 7, into a signal in the radio frequency band and transmits it wirelessly.

The cell search section 4 performs cell search processing, such as identification of a cell and detection of a path, from the signal converted into a baseband signal input from the second radio section 3, and outputs the result to the radio quality measuring section 5.

The radio quality measuring section 5 measures the radio quality (for example, RSCP or Ec/Io) of a service cell or an adjacent cell on the basis of the input from the cell search section 4, and outputs the result to the position and quality data creating section 6.

The position and quality data creating section 6 creates, as the position and quality data, those obtained by associating the measured radio quality, and the acquired position information with each other on the basis of the input from the LCS measuring section 2 and the input from the radio quality measuring section 5, and outputs the result to the position and quality data transmitting and receiving section 9.

The baseband modulation and demodulation section 7 performs baseband demodulation processing on the signal converted into a baseband signal and baseband modulation processing for transmitting the data to the network side through the second radio section 3. Specifically, the baseband modulation and demodulation section 7 performs baseband demodulation processing on a signal in a baseband input from the second radio section 3 and outputs the result to the report information acquisition section 8, the position and quality data transmitting and receiving section 9, or the application data transmitting and receiving section 11, and performs baseband modulation processing on a signal in a baseband input from the position and quality data transmitting and receiving section 9 or the application data transmitting and receiving section 11 and outputs the result to the second radio section 3.

The report information acquisition section 8 acquires and analyzes the report information transmitted from the base station apparatus, among the data after baseband demodulation processing, on the basis of the input from the baseband modulation and demodulation section 7 and outputs the result to the cell selecting section 10.

The position and quality data transmitting and receiving section 9 receives the control data for report request of the position and quality data transmitted from the network side, on the basis of the input from the baseband modulation and demodulation section 7. When there is a report request, the position and quality data transmitting and receiving section 9 converts the position and quality data created by the position and quality data creating section 6 into the data for transmission to the network side and outputs it to the baseband modulation and demodulation section 7 for transmission. In addition, the position and quality data transmitting and receiving section 9 creates the control data for asking the network side about the position and quality data and outputs it to the baseband modulation and demodulation section 7 for transmission, and receives the position and quality data transmitted from the network side on the basis of the input from the baseband modulation and demodulation section 7 and outputs the data to the cell selecting section 10.

The cell selecting section 10 selects a cell to be connected to, selects a cell to shift to, and selects a cell to be added by diversity handover, for example, using the report information acquired by the report information acquisition section 8 and the position and quality data from the network side acquired by the position and quality data transmitting and receiving section 9.

The application data transmitting and receiving section 11 performs transmission and reception of the data (for example, user data) according to the communication application executed by the mobile station apparatus in this example. Specifically, the application data transmitting and receiving section 11 outputs the data, which is to be transmitted, to the baseband modulation and demodulation section 7 and is input with the received data from the baseband modulation and demodulation section 7.

The main controller 12 is connected to each of the sections 1 to 11 and executes call processing and the like as a mobile station apparatus while performing overall control of the sections 1 to 11.

Next, an example of the sequence of operation performed by a mobile station apparatus and the like in the mobile communication system in this example is shown. Moreover, in the mobile station apparatus, control is performed by the main controller 12 and each processing is performed by the main controller 12 and each of the sections 1 to 11.

Figure 3:
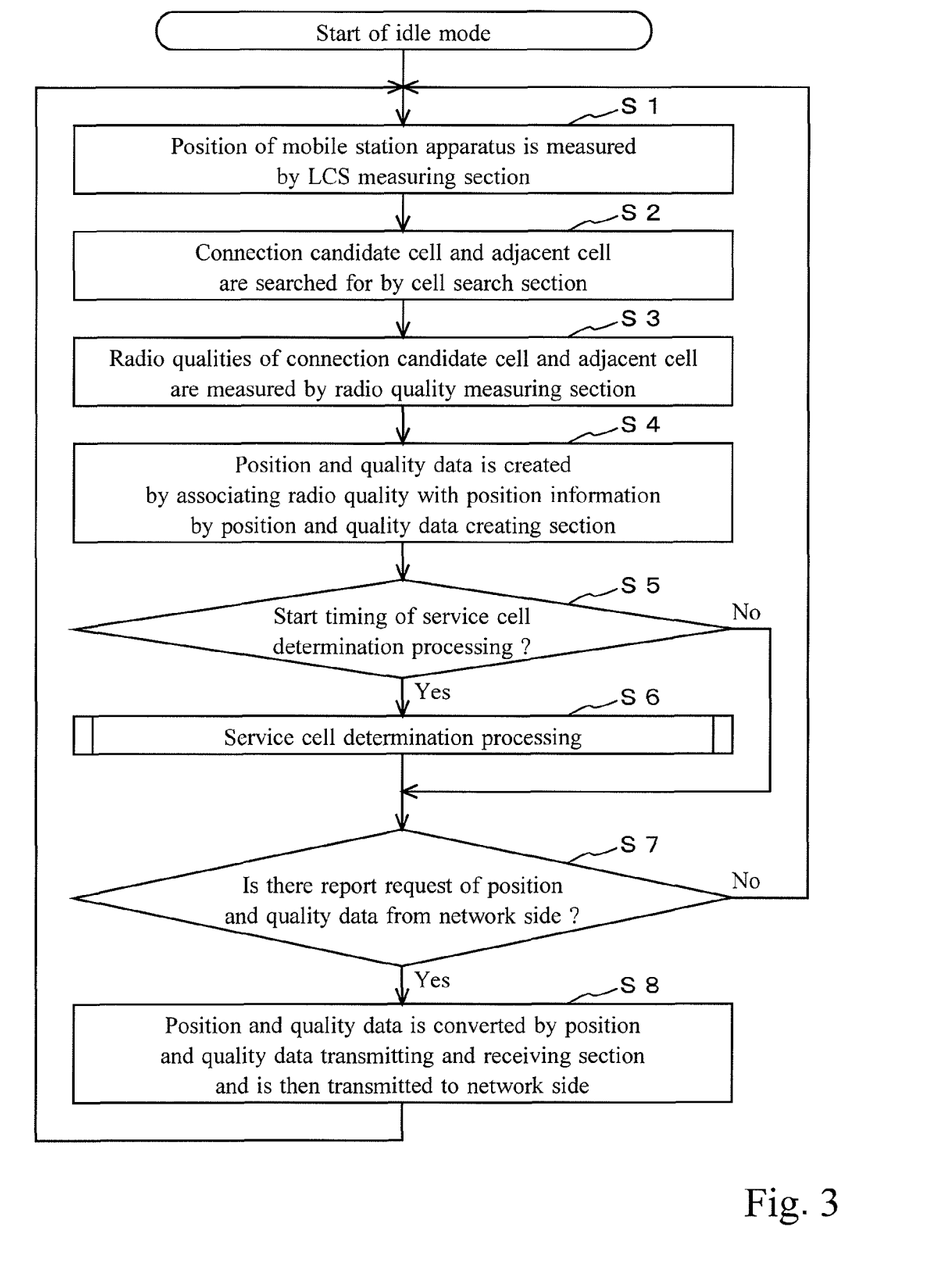
FIG. 3 is a view showing an example of operation in an idle mode.
Figure 4:
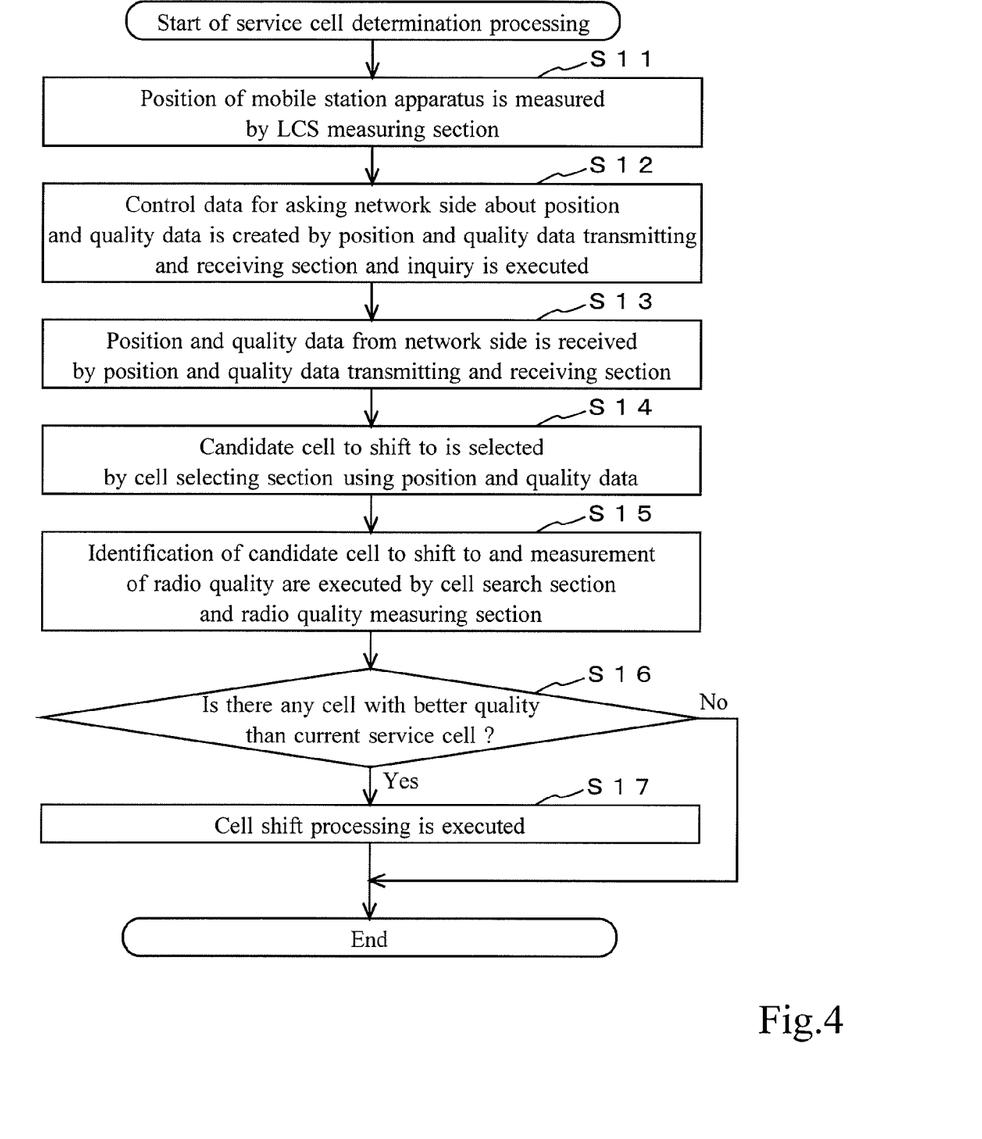
FIG. 4 is a view showing an example of operation (operation of service cell determination processing) in an idle mode.

Referring to FIGS. 3 and 4, an example of operation in an idle mode is shown.

FIG. 3 shows an example of the procedure of operation in the idle mode.

First, the LCS measuring section 2 measures the position of the mobile station apparatus (radio communication terminal) using a GPS signal converted into a baseband signal by the first radio section 1 (step S1).

Then, the cell search section 4 searches for a connection candidate cell and an adjacent cell using a radio signal converted into a baseband signal by the second radio section 3 (step S2).

For cells (here, a connection candidate cell and an adjacent cell) detected as a result of search of the cell search section 4, the radio quality, such as RSCP and Ec/Io, is measured by the radio quality measuring section 5 (step S3).

The position and quality data creating section 6 creates the position and quality data by associating the radio quality measured by the radio quality measuring section 5 with the position information acquired by the LCS measuring section 2 (step S4).

As described above, the position and quality data is collected in the processing of steps S1 to S4.

It is checked whether or not the start timing has come so that service cell determination processing is periodically performed while collecting the position and quality data as described above (step S5). As a result, when it is determined that the start timing of the service cell determination processing has come, the service cell determination processing (step S6) is executed and then the process proceeds to processing of step S7. On the other hand, when it is determined that the start timing of the service cell determination processing has not come, the process proceeds to the processing of step S7.

Then, the position and quality data transmitting and receiving section 9 checks whether or not the control data, which indicates a report request of the position and quality data, has been received from the network side (step S7). As a result, when it is determined that there has been a report request, the position and quality data transmitting and receiving section 9 performs transmission processing, such as data conversion, on the position and quality data created by the position and quality data creating section 6 in order to report it to the network side and transmits the data to the network side through the baseband modulation and demodulation section 7 and the second radio section 3 (step S8). Then, the process returns to step S1. In addition, when it is determined that there has been no report request in step S7, the process returns to the processing of step S1.

Here, report of the position and quality data is requested from the network side to a plurality of mobile station apparatuses, so that the position and quality data corresponding to the position of each mobile station apparatus is reported from the mobile station apparatuses. Moreover, at the network side, the position and quality data from the plurality of mobile station apparatuses is added up, and a database (DB) regarding the radio quality is created from the added position and quality data. In this radio quality database, the information indicating which cell is received in which position and which quality is stored.

Moreover, report of the position and quality data is periodically requested from the network side to mobile station apparatuses in the idle mode which are subordinate thereto, and the newest position and quality data is acquired. Moreover, at the network side, a radio quality database is updated using the data.

In addition, at the network side, when there is an inquiry about the position and quality data from a mobile station apparatus, the position and quality data of the inquiry position is transmitted to the mobile station apparatus through the base station apparatus using the radio quality database.

Figure 2:
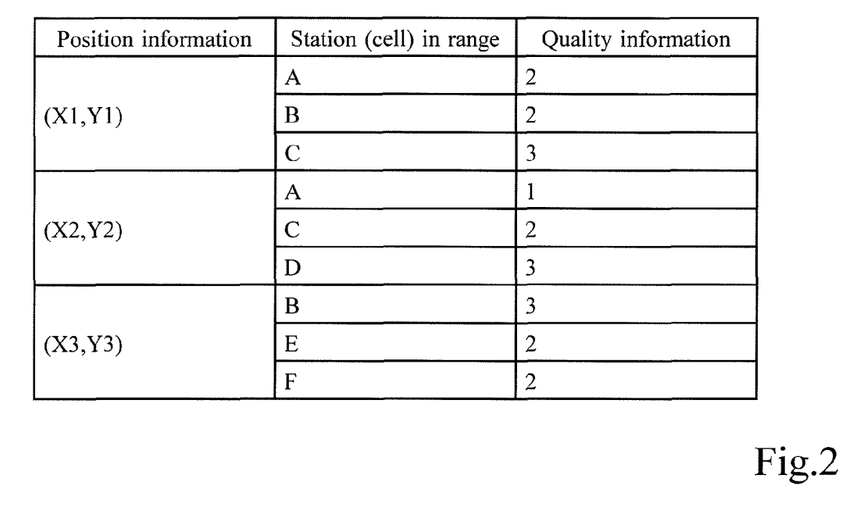
FIG. 2 is a view showing an example of the content of a radio quality database (association table of the position information and the quality information at the network side)

FIG. 2 shows an example of an association table of the position information and the quality information at the network side as an example of the content of the radio quality database.

In the radio quality database in this example, the position information regarding a mobile station apparatus, a station (cell) within a range, and the quality information regarding a station within a range are matched with each other.

Specifically, the position information is expressed as coordinate values of the Cartesian coordinate system provided on the plane, for example, like (X1, Y1). In addition, the station within a range indicates the identification information of a station (cell) which can be received at each position. For example, in the position information (X1, Y1), signals from stations A, B, and C can be wirelessly received (detected). In addition, the quality information is expressed as numeric values, such as 1, 2, and 3, corresponding to the respective stations. For example, the higher the number, the better the quality.

Here, the position information may be set in advance at the network side on the basis of the map information stored in a memory, for example. In addition, the position information may not necessarily be set for every point. For example, a predetermined position range may be used. As a specific example, the position information (X1, Y1) may indicate a predetermined range (for example, a communication area of each base station apparatus) including a point of the position coordinates (X1, Y1).

In addition, not only the position information or the quality information but also the information regarding a time, at which the position information or the quality information was acquired, and the like may be matched.

Thus, in this example, the radio wave conditions of a plurality of cells at a certain point are managed at the network side. Accordingly, for example, a best cell can be extracted from a plurality of cells at a certain point.

In addition, the table shown in FIG. 2 is just an example, and various things may be used. For example, it is also possible to use the quality information in which the lower the number, the better the quality. In addition, various things other than the numeric values may be used.

FIG. 4 shows an example of the procedure of service cell determination processing (step S6) in FIG. 3. The service cell determination processing is a process of comparing the radio quality of a current service cell with the radio quality of an adjacent cell and shifting from the service cell to a cell with better quality. In addition, the service cell determination processing and the data call processing from the network side are performed in parallel.

First, the LCS measuring section 2 measures the position of the mobile station apparatus (radio communication terminal) using a GPS signal converted into a baseband signal by the first radio section 1 (step S11).

The position and quality data transmitting and receiving section 9 creates the control data for asking the network side about the position and quality data of the position acquired by the LCS measuring section 2 (in processing of step S11) and then transmits it to the network side through the baseband modulation and demodulation section 7 and the second radio section 3 (step S12).

Then, in response to the inquiry about the position and quality data from the mobile station apparatus side, the network side transmits the position and quality data of the inquiry position to the mobile station apparatus through the base station apparatus. Then, the position and quality data transmitting and receiving section 9 receives the position and quality data from the network side (step S13).

The cell selecting section 10 selects a candidate cell to shift to other than the service cell using the position and quality data acquired by the position and quality data transmitting and receiving section 9 (in processing of step S13) (step S14).

Here, the position and quality data from the network side is created on the basis of the position and quality information from a plurality of mobile station apparatuses collected at the network side, and the information regarding a cell, which can be detected from the position inquired by the mobile station apparatus is included together with the quality information.

By checking the quality information, it becomes possible to improve the precision in selecting a candidate cell to shift to.

Regarding the candidate cell to shift to which is selected by the cell selecting section 10 (in processing of step S14), the radio quality measuring section 5 measures the radio quality, such as RSCP or Ec/Io, by the cell detected as a result of search of the cell search section 4 (step S15). That is, the selection result of the cell selecting section 10 is reflected on the search of the cell search section 4 or the radio quality measurement of the radio quality measuring section 5.

It is determined whether or not there is a cell with better quality than the current service cell by comparing the radio quality (cells other than the current service cell) acquired by the radio quality measuring section 5 (in processing of step S15) with the radio quality of the current service cell (step S16). As a result, when it is determined that there is a cell with better quality than the current service cell, cell shift processing is executed to set the cell as a current service cell (step S17), and the service cell determination processing is ended. On the other hand, when it is determined that there is no cell with better quality than the current service cell, the service cell determination processing is ended.

Thus, in the idling mode, a mobile station apparatus creates the position and quality data and also periodically performs a service cell determination processing while reporting the position and quality data in response to a request from the network side. That is, in the idling mode, a mobile station apparatus operates to shift to a cell with better quality.

Figure 5:
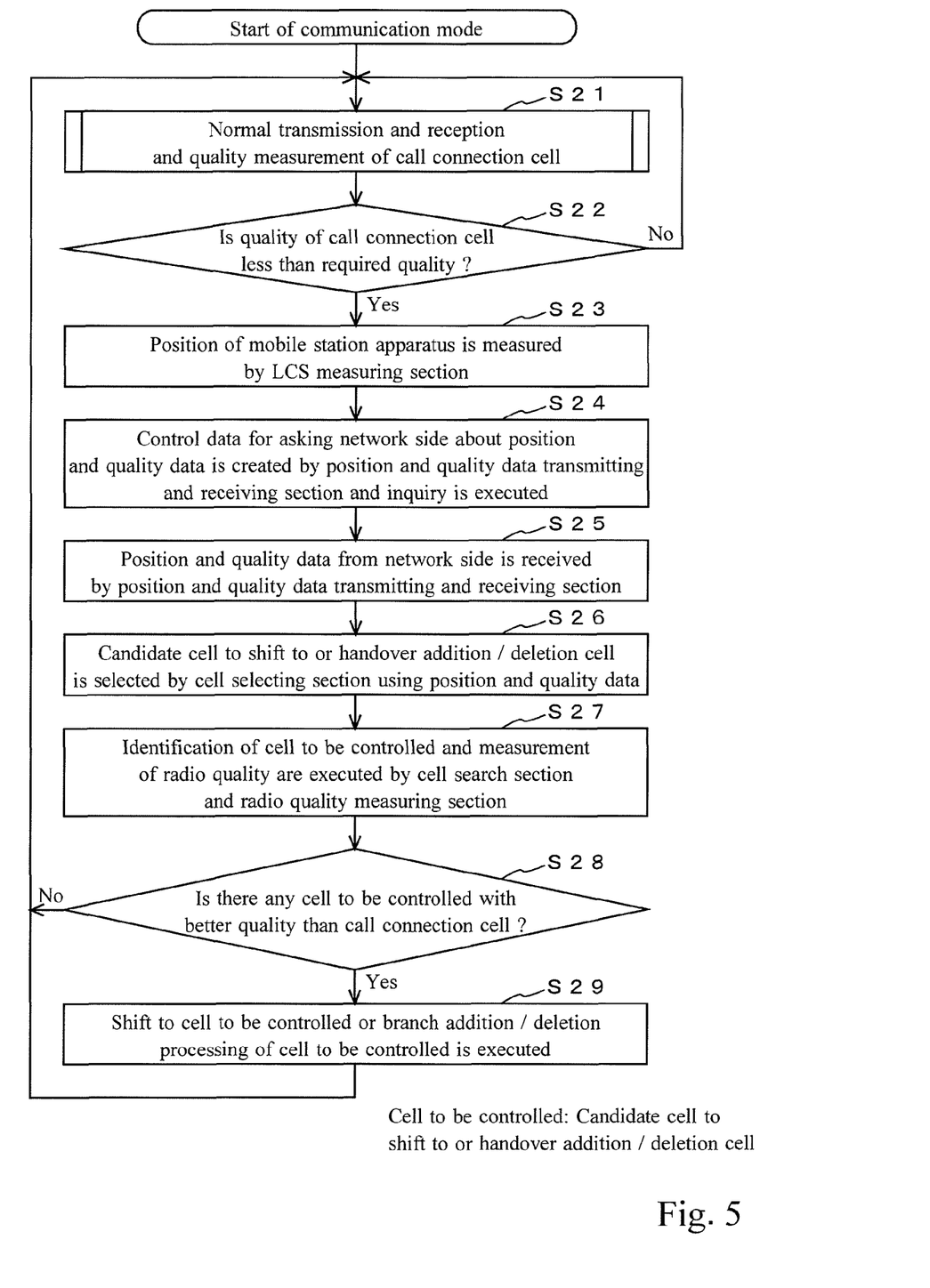
FIG. 5 is a view showing an example of operation in a communication mode.

Referring to FIG. 5, an example of operation in a communication mode is shown.

FIG. 5 shows an example of the procedure of operation in the communication mode.

In a mobile communication system, shift of a service cell according to the movement of a mobile station apparatus is frequently performed, and it is performed through a handover state during communication. According to the shift of a service cell, the main controller 12 performs call processing with respect to the network side and the like while performing overall control of the sections 1 to 11, and the application data transmitting and receiving section 11 performs communication processing (data transmission and reception) using a terminal application function.

The transmission data subjected to communication processing is transmitted after being converted into a radio signal by the baseband modulation and demodulation section 7 and the second radio section 3 and the received radio signal is converted into the received data by the second radio section 3 and the baseband modulation and demodulation section 7 so that the communication state is maintained. In parallel to the communication, the quality of a cell during call connection is measured by the cell search section 4 and the radio quality measuring section 5 (step S21).

It is monitored whether or not the radio quality of the cell during call connection has deteriorated to become less than the required quality (step S22). As a result, when it is determined that the radio quality of the cell during call connection has not become less than the required quality, the process returns to processing of step S21.

On the other hand, when it is determined that the radio quality of the cell during call connection has become less than the required quality, a cell to shift to or a handover destination cell is searched for.

An operation of searching for a cell to shift to or a handover destination cell will now be described.

The LCS measuring section 2 measures the position of a mobile station apparatus (radio communication terminal) using a GPS signal converted into a baseband signal by the first radio section 1 (step S23).

The position and quality data transmitting and receiving section 9 creates the control data for asking the network side about the position and quality data of the position acquired by the LOS measuring section 2 (in processing of step S23) and then transmits it to the network side through the baseband modulation and demodulation section 7 and the second radio section 3 (step S24).

Then, in response to the inquiry about the position and quality data from the mobile station apparatus side, the network side transmits the position and quality data of the inquiry position to the mobile station apparatus through the base station apparatus. The position and quality data transmitting and receiving section 9 receives the position and quality data from the network side (step S25).

The cell selecting section 10 selects a candidate cell to shift to or a handover addition/deletion cell (in the following processing, called a cell to be controlled) using the position and quality data acquired by the position and quality data transmitting and receiving section 9 (in processing of step S25) (step S26).

Regarding the cell to be controlled which is selected by the cell selecting section 10 (in processing of step S26), the radio quality measuring section 5 measures the radio quality, such as RSCP or Ec/Io, by the cell detected as a result of search of the cell search section 4 (step S27). That is, the selection result of the cell selecting section 10 is reflected on the search of the cell search section 4 or the radio quality measurement of the radio quality measuring section 5.

It is determined whether or not there is a cell to be controlled, which has better quality than a cell during call connection, by comparing the radio quality (cells other than the cell during call connection) acquired by the radio quality measuring section 5 (in processing of step S27) with the radio quality of the cell during call connection (step S28). As a result, when it is determined that there is a cell to be controlled which has better quality than the cell during call connection, cell shift processing or branch addition/deletion processing is executed (step S29), and the process returns to step S21. On the other hand, when it is determined that there is no cell to be controlled which has better quality than the cell during call connection, the process returns to processing of step S21.

In this example, the cell shift processing is executed when the cell to be controlled is a candidate cell to shift to, and the branch addition/deletion processing (branch addition processing or branch deletion processing) is executed when the cell to be controlled is a handover addition/deletion cell (handover addition cell or handover deletion cell).

Thus, in a communication mode, a mobile station apparatus generally performs transmission and reception processing and measures the quality of a cell during call connection. When the quality of the cell during call connection becomes less than the required quality, a cell to shift to or a handover destination cell is searched for and shift to a cell with better quality is performed or branch addition or branch deletion of a cell whose quality has deteriorated is performed to thereby maintain a communication state.

As described above, the mobile communication system in this example has the following configuration.

That is, a mobile station apparatus has: a function (first radio section 1 and LCS measuring section 2) of receiving a GPS signal and acquiring the position information using the received GPS signal; a function (second radio section 3) of performing band conversion between a signal in a radio frequency band and a signal in a baseband regarding a communication signal between a base station apparatus and a mobile station apparatus; a function (cell search section 4 and the radio quality measuring section 5) of measuring the radio quality of a cell formed by the base station apparatus; a function (baseband modulation and demodulation section 7) of performing processing for demodulating the data transmitted from the network side to the mobile station apparatus through the base station apparatus and for modulating the data transmitted from the mobile station apparatus to the network side through the base station apparatus; a function (position and quality data creating section 6) of creating the position and quality data by associating the measured radio quality with the acquired position information; and a function (position and quality data transmitting and receiving section 9) of transmitting the created position and quality data to the network side when there is a request from the network side regarding report of the position and quality data.

In addition, the network side has: a function of adding up the position and quality data from a plurality of mobile station apparatuses; a function of creating and updating a radio quality database from the added position and quality data; and a function of transmitting the position and quality data of the inquiry position to a corresponding mobile station apparatus through a base station apparatus using the radio quality database when there is an inquiry about the position and quality data from the mobile station apparatus.

As an example of the configuration, when a mobile station apparatus is in a standby state in a service cell, the mobile station apparatus creates the position and quality data while measuring the radio qualities of the service cell and an adjacent cell on the basis of the adjacent station information notified through the report information. When there is a report request of the position and quality data from the network side, the mobile station apparatus transmits the created position and quality data to the network side.

As an example of the configuration, a mobile station apparatus asks the network side about the position and quality data in order to search for other cells to shift to or other cells for handover in preparation for deterioration of the radio quality of a cell in a standby state or during communication in a service cell.

Therefore, in the mobile communication system in this example, it is possible to solve a problem in that it takes time to detect a candidate cell to shift to or a handover addition/deletion candidate cell which is a disadvantage of the operation of a mobile station apparatus in the related art. Specifically, the position of a mobile station apparatus is specified using LCS, and the data (position and quality data) in which the radio quality of a cell and the position of the mobile station apparatus measured by the mobile station apparatus are associated with each other is transmitted to the network side. At the network side, the position and quality data from each mobile station apparatus is compiled in a database, and the position and quality data stored in the database is transmitted from the network side to the mobile station apparatus in response to an inquiry from the mobile station apparatus. Using the position and quality data which is a result of the inquiry to the network side, the mobile station apparatus can quickly and simply perform cell shift processing or handover processing in a communicating state (during communication) or it is possible to improve the precision in selecting a candidate cell to shift to or a handover candidate cell.

As a specific example, the information regarding the qualities of candidates of a plurality of adjacent base station apparatuses (cells) (for example, instead of one base station apparatus) can be received and the quality state of each cell (for example, instead of the quality state of each mere location) can be stored at the network side, in this example.

Moreover, in this example, the range of candidate cells can be limited and narrowed at the time of reselection, such as handover. For example, a main control station apparatus (main controller) at the network side can narrow it by designating a connection station candidate (candidate cell) to a mobile station apparatus (radio communication terminal) on the basis of the service database (radio quality database). The information in which the position information and the quality information are associated with each other can be used as the narrowed information. As an example, base station apparatuses (cells), for example, 64 stations when this database is not used can be (automatically) narrowed to 3 stations by using this database.

The main control station apparatus at the network side collects the position information and the quality information regarding a plurality of mobile station apparatuses which are checked, compiles them into a database or updates the position information and the quality information as necessary, and designates a candidate station (cell) to be connected with the mobile station apparatus on the basis of the database at the time of handover or the like of the mobile station apparatus so that the mobile station apparatus can be connected to an optimal station in a short time at the time of handover or the like.

In addition, a cell may also be selected so as to be associated with the quality information using the quality information (for example, instead of display of a communicable area or a radio wave state). Here, selection and switching of a cell is performed in the order of sensing (detection), selection, and switching.

Moreover, in this example, radio wave conditions of a plurality of cells at a certain point are managed at the network side. Accordingly, it is possible to extract a best cell from a plurality of cells at a certain point. In addition, it does not matter even if there is a point at which the number of candidate cells is 0 or 1.

As described above, in this example, a best cell can be selected by comparing a plurality of cells and it is also possible to check the location (position information), at which a mobile station apparatus currently exists, and the communication quality (quality information) (for example, instead of checking only the radio wave condition of a predetermined area). Accordingly, since the information regarding a system which can be used at the location can be provided to the mobile station apparatus quickly and correctly, it may be one of the effective options of a plurality of cell selection systems, for example.

Moreover, in this example, the information regarding a plurality of mobile station apparatuses can be collected in a sequential manner and the information in a predetermined area (for example, in a predetermined base station apparatus) can be averaged and stored at the network side. As a result, a cell shift location can be simplified.

In addition, this example may also be used as a method of guiding a mobile station apparatus with some defects. For example, it is possible to restrict a call area of a mobile station apparatus which is difficult to connect in a certain area.

In addition, this example is realized as a communication protocol instead of applications, for example. For example, in execution in this example, it is practical to execute it in a self-management system, such as an in-plant wireless system.

In addition, in this example, it is possible to realize a communication protocol which selects a cell using the quality information. For example, it may be a determination material in the case of selecting one from WiMAX (Worldwide Interoperability for Microwave Access) and LTE (Long Term Evolution).

Moreover, in the mobile station apparatus of the communication system (mobile communication system) in this example, a position information acquisition means is formed by the function of the first radio section 1 or the LCS measuring section 2, a search means is formed by the function of the cell search section 4, a quality information detecting means is formed by the function of the radio quality measuring section 5, a quality information transmitting means is formed by the function of the position and quality data creating section 6 or the position and quality data transmitting and receiving section 9, a quality information receiving means is formed by the function of the position and quality data transmitting and receiving section 9, and a cell selecting means is formed by the function of the cell selecting section 10.

Moreover, in the main control station apparatus at the network side in the communication system (mobile communication system) in this example, a network side quality information receiving means, a network side quality information storage means, and a network side quality information transmitting means are provided, and a position range storage means and a data processing means are provided.

As an example of the configuration, in a communication system where a mobile station apparatus communicates with a network side through a base station apparatus, the following configuration is adopted.

That is, in the mobile station apparatus, the position information acquisition means acquires the position information regarding the apparatus (corresponding mobile station apparatus). The search means searches for a cell of the base station apparatus. The quality information detecting means detects the quality information of radio communication regarding the cell searched for by the search means. The quality information transmitting means transmits to the network side the data in which the position information acquired by the position information acquisition means is associated with the quality information regarding each cell detected by the quality information detecting means. The quality information receiving means receives the quality information regarding each cell corresponding to the position information regarding the apparatus (corresponding mobile station apparatus) transmitted from the network side. The cell selecting means selects a cell on the basis of the quality information regarding each cell corresponding to the position information regarding the apparatus (corresponding mobile station apparatus) received by the quality information receiving means.

In addition, at the network side, the network side quality information receiving means receives the data in which the position information transmitted from the mobile station apparatus is associated with the quality information regarding each cell. The network side quality information storage means stores the data received by the network side quality information receiving means (or the content of a result obtained by processing the data). The network side quality information transmitting means transmits to the mobile station apparatus the quality information regarding each cell, which corresponds to the position information regarding the mobile station apparatus, on the basis of the content stored in the network side quality information storage means.

Accordingly, for example, it is possible to simplify cell shift processing and handover processing in a communication state. This can improve the efficiency.

Here, as a cell searched for by the search means, an arbitrary cell may be used. For example, one or more of a connection candidate cell, a cell existing in the vicinity, a cell selected by the selection function, and the like may be used.

In addition, various things may be used as the quality information of radio communication. For example, a combination (for example, an average result) of the detection values of two or more kinds of quality information items may be used.

In addition, various things may be used as the position information. For example, the coordinate position on the plane, such as a map, may be used. Moreover, it may not necessarily be information regarding the position of one point, and the information regarding a predetermined range (range including a plurality of positions) may also be used as the position information.

In addition, one item of the position information may be associated with the quality information regarding each of a plurality of cells. In addition, the number of cells associated with one item of the position information may be 0 or 1.

Moreover, an arbitrary cell may be used as a cell selected by the cell selecting means. For example, one or more of a candidate cell to shift to, a cell added or removed at the time of handover, and the like may be used.

In addition, various methods may be used as a method in which a mobile station apparatus selects a cell on the basis of the quality information regarding each cell corresponding to the position information regarding the apparatus. For example, it is also possible to use a method of selecting all cells corresponding to the position information regarding the apparatus or a method of selecting one or more from cells corresponding to the position information regarding the apparatus.

Moreover, at the network side, for example, various kinds of control or processing are performed by an apparatus (for example, a main control station apparatus) provided in the network.

Moreover, at the network side, the data in which the position information and the quality information regarding each cell are associated with each other may be received from a plurality of mobile station apparatuses, for example, for the same or different positions. Alternatively, for the same or different positions, the data in which the position information and the quality information regarding each cell are associated with each other may be received from one mobile station apparatus a plural number of times.

In addition, transmitting the data, in which the position information and the quality information regarding each cell are associated with each other, from a mobile station apparatus to the network side is performed in response to a report request transmitted from the network side to the mobile station apparatus, for example.

In addition, transmitting the data, in which the position information and the quality information regarding each cell are associated with each other, from the network side to a mobile station apparatus is performed in response to an inquiry including the position information regarding the mobile station apparatus, which is transmitted from the mobile station apparatus to the network side, for example.

In the communication system according to the present invention, the following configuration is adopted as an example.

That is, at the network side, the position range storage means stores a plurality of position ranges set for the position of a mobile station apparatus. On the basis of the data received from a plurality of mobile station apparatuses by the network side quality information receiving means, the data processing means averages the quality information regarding each cell corresponding to the position information included in a position range for every position range stored in the position range storage means, and the result (result of processing) is stored in the network side quality information storage means.

Therefore, at the network side, a correspondence between the position information (here, information regarding a position range) and the quality information regarding each cell can be generated and stored on the basis of the data from the plurality of mobile station apparatuses, and the information can be provided to the mobile station apparatus.

Here, the position range storage means may be formed by using a memory, for example.

In addition, the position range may be set in advance or a means for setting a position range may be provided at the network side of a communication system, for example.

Moreover, various ranges may be used as a plurality of position ranges. For example, it is possible to use ranges with the same (or almost similar) size and shape.

According to an aspect of the invention, there is provided a communication system in which a network side and a mobile station apparatus communicate with each other through a base station apparatus. The mobile station apparatus includes: a position information acquisition means for acquiring position information regarding the mobile station apparatus; a search means for searching for a cell of the base station apparatus; a quality information detecting means for detecting quality information of radio communication regarding the cell searched for by the search means; a quality information transmitting means for transmitting data, in which the position information acquired by the position information acquisition means and the quality information regarding each cell detected by the quality information detecting means are associated with each other, to the network side; a quality information receiving means for receiving the quality information regarding each cell corresponding to the position information regarding the mobile station apparatus transmitted from the network side; and a cell selecting means for selecting a cell on the basis of the quality information regarding each cell corresponding to the position information regarding the mobile station apparatus received by the quality information receiving means. The network side includes: a network side quality information receiving means for receiving the data in which the position information transmitted from the mobile station apparatus and the quality information regarding each cell are associated with each other; a network side quality information storage means for storing the data received by the network side quality information receiving means or a result after processing the data; and a network side quality information transmitting means for transmitting the quality information regarding each cell, which corresponds to the position information regarding the mobile station apparatus, to the mobile station apparatus on the basis of the content stored in the network side quality information storage means.

In the aspect of the invention, preferably, the network side further includes: a position range storage means for storing a plurality of position ranges set for the position of the mobile station apparatus; and a data processing means for averaging the quality information regarding each cell, which corresponds to the position information included in the position range, for every position range stored in the position range storage means on the basis of the data received from a plurality of mobile station apparatuses by the network side quality information receiving means and stores the result in the network side quality information storage means.

In the aspect of the invention, preferably, at least one or more of a cell of a connection candidate, a cell existing in the vicinity, and a cell selected by a selection function is used as a cell searched for by the search means.

In the aspect of the invention, preferably, a combination of detection values of two or more kinds of quality information is used as the quality information of radio communication.

In the aspect of the invention, preferably, regarding the position information, information in a predetermined range is used as the position information using the coordinate positions on the plane of a map.

In the aspect of the invention, preferably, one item of the position information is associated with the quality information regarding each of a plurality of cells.

In the aspect of the invention, preferably, at least one or more of a candidate cell to shift to and a cell added or removed at the time of handover is used as a cell selected by the cell selecting means.

In the aspect of the invention, preferably, the cell selecting means selects all cells corresponding to the position information regarding the mobile station apparatus or selects one or more from cells corresponding to the position information regarding the mobile station apparatus.

In the aspect of the invention, preferably, at the network side, for the same or different positions, data in which the position information and the quality information regarding each cell are associated with each other is received from the plurality of mobile station apparatuses.

In the aspect of the invention, preferably, at the network side, for the same or different positions, data in which the position information and the quality information regarding each cell are associated with each other is received from the one mobile station apparatus a plural number of times.

In the aspect of the invention, preferably, the mobile station apparatus creates the position and quality data while measuring the radio qualities of a service cell and an adjacent cell on the basis of adjacent station information notified through the report information when the mobile station apparatus is in a standby state in the service cell, and transmits the created position and quality data to the network side when there is a report request of the position and quality data from the network side.

In the aspect of the invention, preferably, in order to transmit from the network side to the mobile station apparatus the data in which the position information and the quality information regarding each cell are associated with each other, the mobile station apparatus asks the network side about position and quality data, which includes the position information regarding the mobile station apparatus, in a service cell in order to search for other cells to shift to or other cells for handover in preparation for deterioration of the radio quality of a cell in a standby state or during communication.

In the aspect of the invention, preferably, the radio wave conditions of a plurality of cells at a certain point are managed at the network side, and a best cell is extracted from the plurality of cells at the certain point.

In the aspect of the invention, preferably, the network side has a function of adding up the position and quality data from the plurality of mobile station apparatuses, a function of creating and updating a radio quality database from the added position and quality data, and a function of transmitting the position and quality data of the inquiry position to the corresponding mobile station apparatus through the base station apparatus using the radio quality database when there is an inquiry about the position and quality data from the mobile station apparatus.

In the aspect of the invention, preferably, the network side receives the quality information regarding candidates of the plurality of adjacent base station apparatuses, and a quality state of each cell is stored in the radio quality database.

In the aspect of the invention, preferably, by the radio quality database, the network side designates a connection station candidate to the mobile station apparatus in order to narrow a range of candidates.

Here, the configurations of the system and the apparatus according to the invention are not necessarily limited to those described above, but various configurations may be used. Moreover, the invention may also be provided as a method of executing the processing according to the invention, a program for realizing such a method, or a recording medium in which the program is recorded, for example. In addition, the invention may be provided as various systems or apparatuses.

In addition, application fields of the invention are not necessarily limited to those described above, but the invention may be applied to various fields.

Moreover, for various kinds of processing performed by the system or the apparatus according to the invention, it is possible to use a configuration controlled when a processor of the hardware resources including a processor, a memory, and the like executes a control program stored in a ROM (Read Only Memory), for example. Moreover, for example, respective functional means for executing the processing may be configured as independent hardware circuits.

In addition, the invention may be understood as a computer readable recording medium, such as a floppy (registered trademark) disc or a CD (Compact Disc)-ROM in which the above-described control program is stored, or as the program itself. In this case, the processing according to the invention can be executed by inputting the control program from the recording medium to a computer and making a processor execute the control program.

What is claimed is:

1. A communication system in which a network side and a plurality of mobile station apparatuses communicate with each other through a base station apparatus,
   wherein the mobile station apparatus comprises:
   a position information acquisition means for acquiring position information regarding the mobile station apparatus;
   a search means for searching for a cell of the base station apparatus;
   a quality information detecting means for detecting quality information of radio communication regarding the cell searched for by the search means;
   a quality information transmitting means for transmitting the position and quality data, in which the position information acquired by the position information acquisition means and the quality information regarding each cell detected by the quality information detecting means are associated with each other, to the network side;
   a quality information receiving means for receiving the quality information regarding each cell corresponding to the position information regarding the mobile station apparatus transmitted from the network side; and
   a cell selecting means for selecting a cell on the basis of the quality information regarding each cell corresponding to the position information regarding the mobile station apparatus received by the quality information receiving means, and
   the network side comprises:
   a network side quality information receiving means for receiving the position and quality data in which the position information transmitted from the mobile station apparatus and the quality information regarding each cell are associated with each other;
   a network side quality information storage means for adding up the position and quality data from the plurality of mobile station apparatuses, creating a database regarding radio quality from the added position and quality data in which the position information of the mobile station apparatus, the cell and the quality information are associated with each other, and updating the database by periodically requesting a transmission of the position quality data to the mobile station apparatus; and
   a network side quality information transmitting means for transmitting the quality information regarding each cell, which corresponds to the position information regarding the mobile station apparatus, to the mobile station apparatus on the basis of the database stored in the network side quality information storage means, when there is an inquiry about the position and quality data from the mobile station apparatus,
   wherein the network side further comprises:
   a position range storage means for storing a plurality of position ranges set for the position of the mobile station apparatus; and
   a data processing means for averaging the quality information regarding each cell, which corresponds to the position information included in the position range, for every position range stored in the position range storage means on the basis of the data received from a plurality of mobile station apparatuses by the network side quality information receiving means and storing the result in the network side quality information storage means, and
   wherein the mobile station apparatus, when it is determined that the radio quality of the cell during call connection has deteriorated to become less than the required quality, receives the quality information regarding each cell which corresponds to the position information regarding the mobile station from the network side, and selects a candidate cell to shift to and conducts the radio quality measuring by using the received quality data, and when it is determined that the candidate cell to be shifted to has better quality than the cell during call connection, executes cell shift processing.

2. The communication system according to claim 1, wherein as a cell searched for by the search means, at least one or more of a cell of a connection candidate, a cell existing in the vicinity, and a cell selected by a selection function is used.

3. The communication system according to claim 1, wherein as the quality information of radio communication, a combination of detection values of two or more kinds of quality information are used.

4. The communication system according to claim 1, wherein regarding the position information, information in a predetermined range is used as the position information using coordinate positions on a plane of a map.

5. The communication system according to claim 1, wherein one item of the position information is associated with the quality information regarding each of a plurality of cells.

6. The communication system according to claim 1, wherein as a cell selected by the cell selecting means, at least one or more of a candidate cell to shift to and a cell added or removed at the time of handover are used.

7. The communication system according to claim 1, wherein the cell selecting means selects all cells corresponding to the position information regarding the mobile station apparatus or selects one or more from cells corresponding to the position information regarding the mobile station apparatus.

8. The communication system according to claim 1,
wherein at the network side, for the same or different positions, data in which the position information and the quality information regarding each cell are associated with each other is received from the plurality of mobile station apparatuses.

9. The communication system according to claim 1,
wherein at the network side, for the same or different positions, data in which the position information and the quality information regarding each cell are associated with each other is received from the one mobile station apparatus a plural number of times.

10. The communication system according to claim 1,
wherein the mobile station apparatus creates position and quality data while measuring radio qualities of a service cell and an adjacent cell on the basis of adjacent station information notified through report information when the mobile station apparatus is in a standby state in the service cell, and transmits the created position and quality data to the network side when there is a report request of the position and quality data from the network side.

11. The communication system according to claim 1,
wherein in order to transmit from the network side to the mobile station apparatus the data in which the position information and the quality information regarding each cell are associated with each other, the mobile station apparatus asks sends an inquiry to the network side about position and quality data, which includes the position information regarding the mobile station apparatus, in a service cell in order to search for other cells to shift to or other cells for handover in preparation for deterioration of the radio quality of a cell in a standby state or during communication.

12. The communication system according to claim 1,
wherein radio wave conditions of a plurality of cells at a certain point are managed at the network side, and a best cell is extracted from the plurality of cells at the certain point.

13. The communication system according to claim 1,
wherein the network side has a function of adding up the position and quality data from the plurality of mobile station apparatuses, a function of creating and updating a radio quality database from the added position and quality data, and a function of transmitting the position and quality data of the inquiry position to the corresponding mobile station apparatus through the base station apparatus using the radio quality database when there is an inquiry about the position and quality data from the mobile station apparatus.

14. The communication system according to claim 13,
wherein the network side receives quality information regarding candidates of the plurality of adjacent base station apparatuses, and a quality state of each cell is stored in the radio quality database.

15. The communication system according to claim 13,
wherein by the radio quality database, the network side designates a connection station candidate to the mobile station apparatus in order to narrow a range of candidates.

* * * * *